UNITED STATES PATENT OFFICE.

HENRY V. DUNHAM, OF MOUNT VERNON, NEW YORK.

KARAYA THICKENER AND PROCESS OF MAKING THE SAME.

1,334,356.    Specification of Letters Patent.    Patented Mar. 23, 1920.

No Drawing.    Application filed July 19, 1919. Serial No. 312,067.

*To all whom it may concern:*

Be it known that I, HENRY V. DUNHAM, a citizen of the United States, residing at Mount Vernon, in the county of Westchester and State of New York, have invented certain new and useful Improvements in Karaya Thickeners and Processes of Making the Same, of which the following is a specification.

The present invention relates to the treatment of karaya gum for the purpose of making a thickening agent, and to the product produced thereby.

Karaya gum is a known material, but it has not heretofore been extensively used, so far as I have been advised, on account of the fact that it is insoluble in water. Placed in water, whether in the form of large or small pieces, it swells greatly, but does not dissolve. The gum has some properties similar to those of tragacanth, and to some extent can be employed as a substitute therefor. It cannot, however, be employed as a substitute for gum tragacanth when the latter is to be employed as an adhesive. The gum is produced from *Sterculia urens* Roxb., *S. vilosa* Roxb., *S. Tragacantha* Lind., *Cochlospermum gossypium* D C. and from other related species of *Sterculia* and *Cochlospermum*. This gum is imported from India, and is much cheaper than tragacanth.

I have found as the result of experimental research that this gum can be dissolved in water if a small amount of alkali is added to the water. The amount of alkali necessary to produce complete solution will vary more or less with different samples of the gum, since the different samples seem to have a different degree of acidity. In this connection, it may be stated that when the gum is added to pure water and allowed to stand for a short time, the water becomes slightly acid in reaction.

As a preferred form of carrying out the process, the following example is given:—

The karaya gum is crushed and added to a large amount of water, for example 100 parts of the gum are crushed and added to from 5,000 to 50,000 parts of water. The mixture is allowed to stand, preferably, for several hours, during which operation the gum swells greatly, but does not dissolve. 3 parts of sodium bicarbonate are then added, (being, if desired, first dissolved in a small amount of water). The mixture is then stirred for a short time and a complete solution is thereby produced. Even when as much as 50,000 parts of water are added to 100 parts of the gum, a very viscous solution is produced. The stated amount of alkali is, with most of the samples of gum which I have seen, a small excess over that which is actually required for complete solution so that the resulting liquid is alkaline to litmus paper. If desired, such an additional quantity of gum may be added that a neutral solution will be produced instead of an alkaline solution. The liquid thereby produced may then be dried in any convenient manner, for which purpose an ordinary milk drying machine, for example the "Just" milk drier, may be used. The product thereby produced is stable, may be kept for months without decomposition, and is readily soluble in water. This solution may be treated with a small amount of acid to render the same neutral or even slightly acid without causing the reprecipitation of the gum. The solution is highly viscous and may be used as a thickener, for example, it may be successfully used in certain lines of baking, in the manufacture of confectionery, ice creams and the like, may be used as a thickener for calcimine compositions or sizing compositions, or for other purposes in which a thickener is desired. The solution of the gum in water is substantially tasteless, and non-injurious to the human digestive system, and hence it is highly suitable for use in thickening edible products.

The original alkaline solution of karaya gum may be made up as above specified, and may then be exactly neutralized by the addition of the necessary amount of free acid (mineral or organic), and the solution dried to produce the dry product which is perfectly stable and water-soluble.

In some instances deficiency of the alkali may be employed in making up the original solution, but this method is ordinarily not recommended since it is difficult to separate the undissolved excess of gum from the viscous solution, filtration of the viscous solution being a slow and tedious operation.

When neutralizing the solution of the redissolved dry product, it is usually advisable not to make the solution more than very slightly acid since reprecipitation of the gum may be produced. For some purposes, however, it may be desirable to produce a product in which a certain proportion of the gum is reprecipitated.

It will be understood that when desired, other substances soluble in alkali may be employed along with the karaya gum, due allowance being made in the amount of alkali used.

I claim:

1. A process of making a soluble dry product suitable for use as a thickener, which comprises dissolving karaya gum in water containing an alkali, and drying the solution.

2. A process of making a soluble dry product suitable for use as a thickener, which comprises dissolving karaya gum in water containing a slight excess of alkali, and drying the solution.

3. A process of making a soluble dry product suitable for use as a thickener, which comprises dissolving karaya gum in water containing sodium bicarbonate equal to about 3% of the weight of the said gum, and drying the solution.

4. A dry product, soluble in water, containing an alkalized karaya gum.

5. A dry product, containing karaya gum rendered water-soluble.

6. A dry product, soluble in water, containing an alkalized karaya gum, and a slight excess of alkali.

In testimony whereof I affix my signature.

HENRY V. DUNHAM.